United States Patent [19]

Ortquist et al.

[11] Patent Number: 5,396,274
[45] Date of Patent: Mar. 7, 1995

[54] VARIABLE FREQUENCY INK JET PRINTER

[75] Inventors: Bruce Ortquist, Upper Arlington, Ohio; Timothy Braun, Roselle; Robert I. Keur, Niles, both of Ill.

[73] Assignee: Videojet Systems International, Inc., Niles, Ill.

[21] Appl. No.: 886,130

[22] Filed: May 20, 1992

[51] Int. Cl.⁶ .................................................. B41J 2/12
[52] U.S. Cl. .......................................... 347/78; 347/5; 347/74
[58] Field of Search .................................. 347/74–81, 347/14, 5, 6,

[56] References Cited

U.S. PATENT DOCUMENTS

| | | | |
|---|---|---|---|
| 3,736,593 | 5/1973 | Keur et al. | |
| 3,787,882 | 1/1974 | Fillmore et al. | 347/78 X |
| 4,216,480 | 8/1980 | Buehner et al. | |
| 4,217,594 | 8/1980 | Meece et al. | 347/78 X |
| 4,337,470 | 6/1982 | Furukawa | |
| 4,435,720 | 3/1984 | Horike et al. | 347/78 X |
| 4,555,711 | 11/1985 | Sato | 347/78 X |
| 4,612,553 | 9/1986 | Kohler | 347/78 |
| 4,626,867 | 12/1986 | Furukawa et al. | 347/19 |
| 4,860,027 | 8/1989 | Ozelis et al. | |
| 4,990,932 | 2/1991 | Houston | 347/81 |
| 5,160,939 | 11/1992 | Bajeux et al. | 347/78 |

FOREIGN PATENT DOCUMENTS 0390427 3/1990 European Pat. Off.

OTHER PUBLICATIONS

*IBM Technical Disclosure Bulletin*, vol. 21, No. 3, "Controlling Drop Velocity and/or Drop Size in an Ink Jet", Chaudhary, K. C., Aug. 1978, pp. 1212–1213.
"High Frequency Oscillography with Electrostatically Deflected Ink Jets", Mar., 1964, Sweet, Richard G.

*Primary Examiner*—Matthew S. Smith
*Attorney, Agent, or Firm*—Rockey, Rifkin and Ryther

[57] ABSTRACT

A method and apparatus are disclosed in which deflection and print speed are controlled by varying the nozzle drive frequency to increase or decrease drop velocity thereby to control drop deflection. The variation is done in a manner to maintain the ratio λ/d and drop size substantially constant. By altering the drop velocity the transit time of the drops through the high voltage deflection field is changed, permitting increased or decreased deflection. The system includes a pressure controller, a velocity sensor, a variable frequency nozzle drive and a processor. Calculations and operations are performed by the processor, based on the size of an operator selected image.

12 Claims, 4 Drawing Sheets

PRINTHEAD SCHEMATIC

PRINTHEAD SCHEMATIC

VARIABLE FREQUENCY INK JET PRINTER

BACKGROUND OF THE INVENTION

This invention relates to ink jet printers. More particularly, it relates to the control of ink jet printers to optimize printing speed while permitting the printing of multiple sized images including fonts and graphics of various types.

A printhead optimized for high speed, small fonts will likely be unable to print tall character fonts. The reason is that the increased deflection required for tall fonts is usually achieved by lengthening the high voltage deflection plates. This also increases the distance to the substrate to be printed. If this distance becomes too great, accurate control of drop deflection becomes impossible for every drop printing. To correct for this the print drops are separated by uncharged guard drops and line speed is reduced by a factor dependent on the number of guard drops. Very often this line speed is lower than that obtainable by a printer optimized for the larger font. The insertion of guard drops to obtain increased deflection height and maintain quality lowers print drop frequency and therefore line speed. This results in a reduction in print line speed by digital steps (i.e. ½, ⅓, ¼ by using every other drop, every third drop and every fourth drop to print).

A distance referred to as the "merge distance" defines the distance from the beginning of the deflection field to a point beyond which printing is no longer satisfactory, i.e. print quality line. There are merge distances for every drop printing, every other drop printing, every third drop printing and so on. These distances move out progressively since it is easier to achieve correct drop placement for every other drop printing than it is for every drop printing. The merge distance is largely determined by how accurately drops can be placed on a distant substrate. If the distance to the substrate is too great, distortions occur. These distortions are caused mainly by aerodynamic and electrostatic forces. If printing on the substrate is done within the merge distance, drops can be accurately placed. If printing occurs beyond this distance the drops cannot be accurately placed and distortion occurs.

It is important to optimize the print speed for both character definition and quality. Presently this is done by selecting the best frequency for a particular font and designing a printer for that font to the exclusion of significantly different sized fonts. Thus, tall, highly defined characters (requiring, for example, a 30×20 drops matrix) can be printed at their highest quality and speed by a first printer optimized to print them, while higher speed, smaller fonts (such as 5×7 drops) are printed by a different printer optimized to print the smaller fonts. The optimization of a printer for a particular font results in undesirable comprises. For example, to print tall fonts the deflection electrodes may need to be lengthened along with the use of guard drops, which then reduces printing speed. Another approach in the prior art is U.S. Pat. No. 4,337,470 to Furukawa. Drop size is varied to print large images using larger drops formed by reducing the frequency of the stimulation voltage applied to the nozzle stream. Smaller images are printed using smaller drops formed by increasing the frequency. This is undesirable because the quality of printing will vary if the drop size is varied.

SUMMARY OF THE INVENTION

We have discovered that the merge distance remains relatively constant with a change in drop velocity. By changing the frequency of the nozzle stimulation voltage while holding the ratio of $\lambda/d$ and therefore, drop size constant, a significantly increased range of drop deflection can be achieved. This technique permits a single printer device to successfully print images, such as fonts of various sizes or graphics of various forms at optimal speeds. Maximum line speed (print drop frequency) can be obtained throughout a range of desired deflections. Due to the inverse square relationship between deflection and frequency, a small reduction in frequency, with constant drop size, is usually all that is necessary to obtain a desired increase in deflection.

It is accordingly an object to provide an ink jet printer device which cab be optimized for a variety of print speeds and image sizes to eliminate the need for separate printers or printheads for each specific type of print job.

It is an object of the present invention to provide such a method and apparatus.

It is a further object of the invention to provide a control system for an ink jet printer which automatically optimizes nozzle drive frequency and ink pressure to achieve maximum print speed for a given image size.

It is a further object of the invention to provide an ink jet printer in which a single printhead may be used to print a wide range of fonts while optimizing print speed and quality.

It is another object of the invention to provide an ink jet printer that varies drop frequency in response to changes in the print matrix (font) configuration or desired line speed to maintain print quality.

It is a further object of the invention to provide a method and apparatus for operating an ink jet printer using a single printhead which has a minimal guard drop requirement and variable frequency and deflection capability.

These, and other objects of the invention, will become apparent from the remaining portion of the specification.

DETAILED DESCRIPTION

In the prior art, optimal printing of a selected image size or font was accomplished by designing a printer to print that image and to compromise the performance of the printer for other image sizes. The present invention substantially reduces the need for printers designed to print selected fonts or a range of selected fonts, by permitting a single device, with automatic adjustments, to print both large and small fonts at optimum speeds.

It is known that the velocity of a stream of ink drops is the product of the drop spacing ($\lambda$) and nozzle drive frequency (f): v=fλ. If drop spacing is maintained constant, then the stream velocity is directly proportional to nozzle drive frequency. In order to print larger images and stay within the merge distance of a printer, it is necessary to get increased deflection without increasing distance to the substrate. As deflection is inversely proportional to the square of the velocity, greater deflection can be obtained by lowering the drop frequency (with appropriate adjustments to pressure to maintain drop spacing and size constant). Conversely, if less deflection is required, drop frequency can be increased until deflection is correct. In this way, it is possible to optimize a given printhead for taller character images without limiting the high line speed desired for shorter images.

Figure 1:
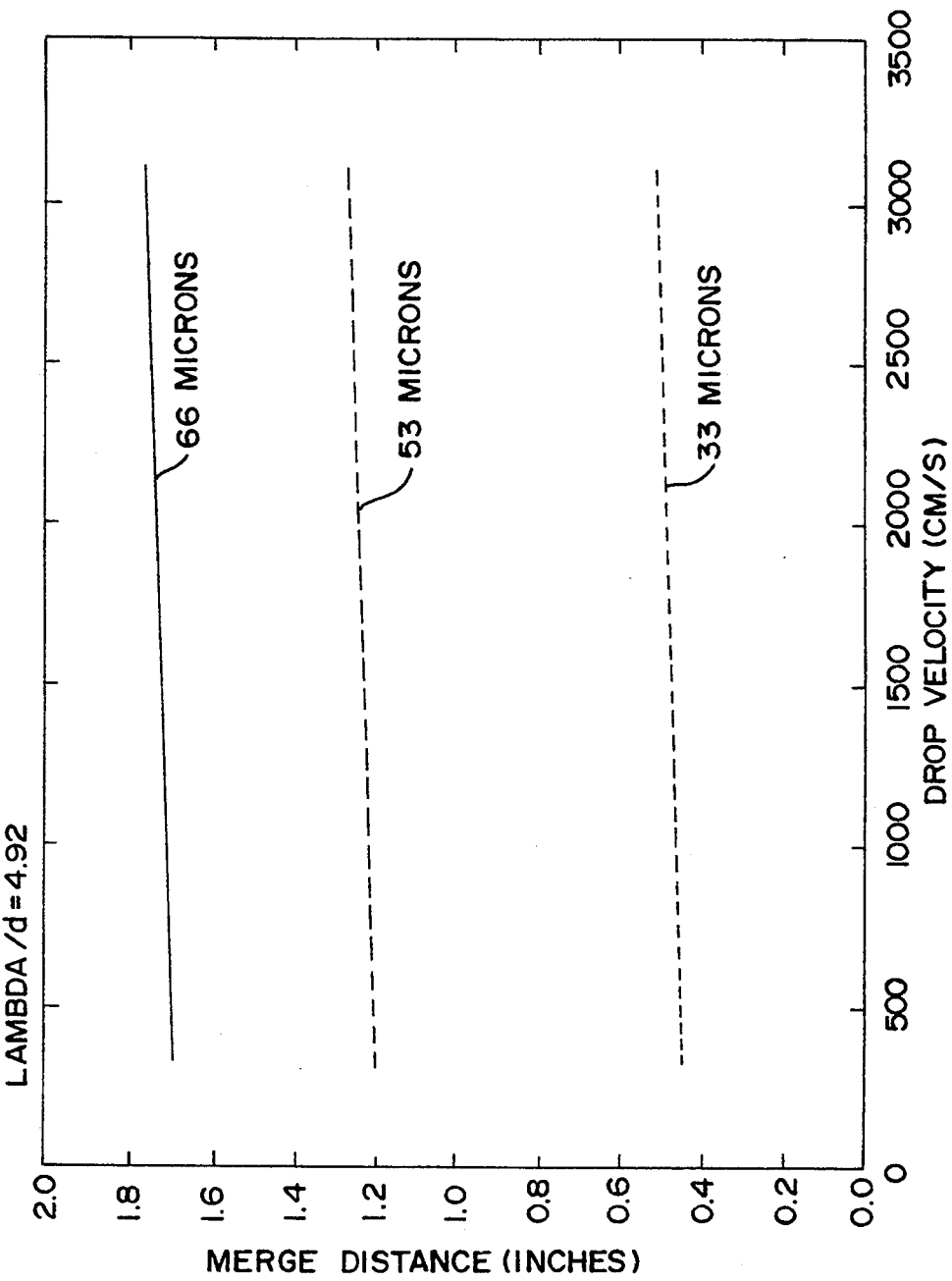
FIG. 1 is a graph illustrating merge distance versus drop velocity for ink jet printers having various nozzle orifice sizes.

Referring to FIG. 1, it can be seen that every orifice diameter has a characteristic merge distance to the substrate. For smaller orifices, the distance to the substrate must be reduced. If a larger orifice is desired, the distance to the substrate must be increased. This scaling approach is required to optimize print quality by operating within the aforementioned merge zone. It can also be seen in FIG. 1 that velocity affects the merge distance very little for a given orifice diameter. This means that scaling the ink jet printer on the basis of velocity is not required. It is this property that the present invention employs to advantage. Since the merge distance is altered very little by variation in drop velocity, the same printhead design can be used for a variety of frequencies to produce variable deflection.

Figure 4:
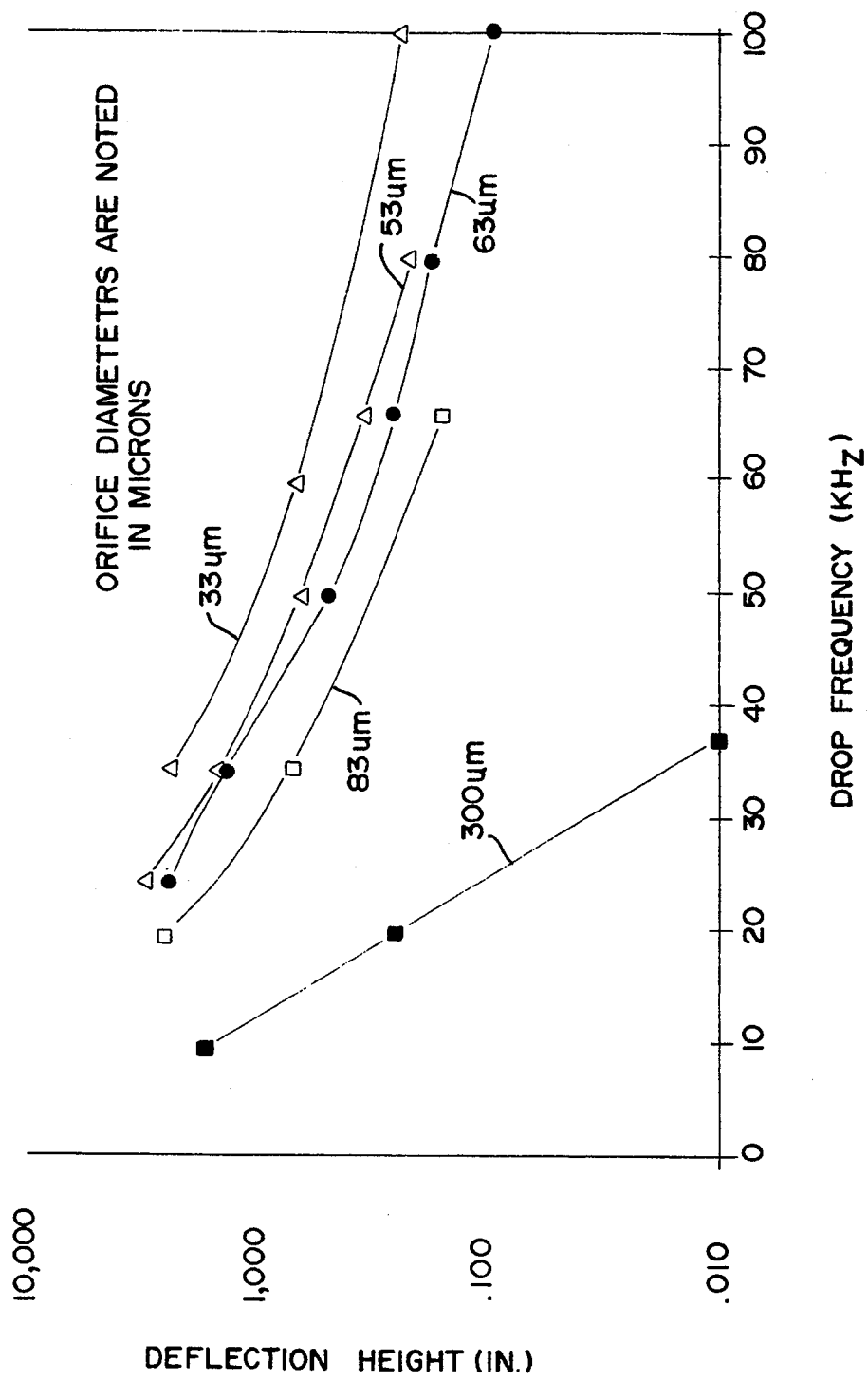
FIG. 4 is a graph of deflection height versus drop frequency for typical nozzle orifice diameters.

Referring to FIG. 4, there is shown typical data relating deflection to drop frequency for a variety of orifice sizes. Note that the vertical scale is logarithmic. As is apparent from the data, there is a significant relationship between frequency and deflection, such that by reducing frequency increased deflection is obtained due to the longer dwell time of charged drops in the deflection field. By adjusting the pressure to compensate for such changes in frequency, the important ratio λ/d (drop spacing to stream diameter) can be maintained constant as is required to ensure proper drop formation. For example, a typical 66 kHz printhead used for smaller fonts can be operated at 50 kHz (with an appropriate pressure adjustment to keep spacing constant) to obtain a substantial increase in drop deflection.

It is unexpected that the drop compensation information for a given image does not change significantly with frequency. That is, drop patterns that print well at a high frequency will also print well at a lower frequency, using the same drop pattern compensation voltages. Thus drop position compensation data taken at one frequency can be used at other frequencies. This allows a printer to store compensation data for all frequencies in the range of a design. This range, for a given orifice size, can be on the order of 4:1. For example, a 63 micron orifice can be operated, according to the invention, between 20 kHz and 80 kHz using drop compensation tables from a mid-frequency range table.

The lower frequency limit for a given printhead is determined based on the effects on the drop stream of gravity and spurious air currents. At lower velocities, gravity begins to bend the drop stream significantly. The table below shows the distance that drop streams will bend for every inch of travel:

| DROP VELOCITY (cm/sec) | STREAM BENDING (inches/in.) |
|---|---|
| 2500 | .0011 |
| 2000 | .0018 |
| 1500 | .0046 |
| 1000 | .0126 |
| 500 | .0285 |
| 250 | .1138 |

Also, ambient air currents can cause a distorted drop image when printing with low drop stream velocities. Depending on orifice size the lower frequency limit can be determined, e.g. for a 63 micron orifice the lower limit is likely to be in the vicinity of 20 kHz, below which air currents and gravity become a factor in correct drop placement.

The upper frequency limit is a function of at least two parameters, ink splatter on the print substrate and Reynolds number in the orifice. Ink splatter will occur when high velocity drops impact on a substrate to be printed. This limit is a function of the overlap of the drops during impact, their viscosity and kinetic energy and the nature of the substrate.

If the orifice Reynolds number becomes too high, turbulent flow can occur within the orifice. This turbulence causes erratic drop separation which will, in turn, affect the ability to control the deflected jet. A typical upper frequency limit for a 63 micron orifice is likely to be in the vicinity of 100 kHz, above which turbulent flow leads to erratic drop formation; also excessive splashing at the print surface occurs.

Because the merge distance and drop position compensation data are essentially independent of drop frequency, a printhead can be designed to be used at many frequencies between the upper and lower limits discussed above. The printhead dimensions are essentially determined by the selection of orifice diameter. To determine the operational frequency range, the largest and smallest images required are examined and the minimum and maximum drop deflections required to produce these images are determined. From the empirical data shown in FIG. 4, for example, upper and lower frequency bounds can be selected for each orifice diameter. Depending on the required deflection, the correct orifice is selected.

It is possible, and preferred, to implement the invention with a computer controller. The printer software is configured so that the frequency is variable and the system operates within the permissible range of frequencies without the need for any hardware changes. Preferably, the frequency is automatically selected when the user inputs a desired image size. Such a system requires: an electrically controlled pressure source to maintain constant drop spacing as frequency is changed; a nozzle having an orifice which operates over the appropriate frequency range (see Sourlis et al. U.S. Pat. No. 4,727,379), and a charge tunnel long enough to accommodate the range of break-off lengths corresponding to the chosen frequency range.

In selecting the nozzle for such a system, it is understood that a particular nozzle and ink combination may not operate well over the entire frequency range selected. If this is the case, the controller can be programmed to avoid certain frequencies. Similarly, if the nozzle drive amplitude is too high at a certain frequency, then the controller can hunt for a more drivable nearby frequency.

Figure 2:
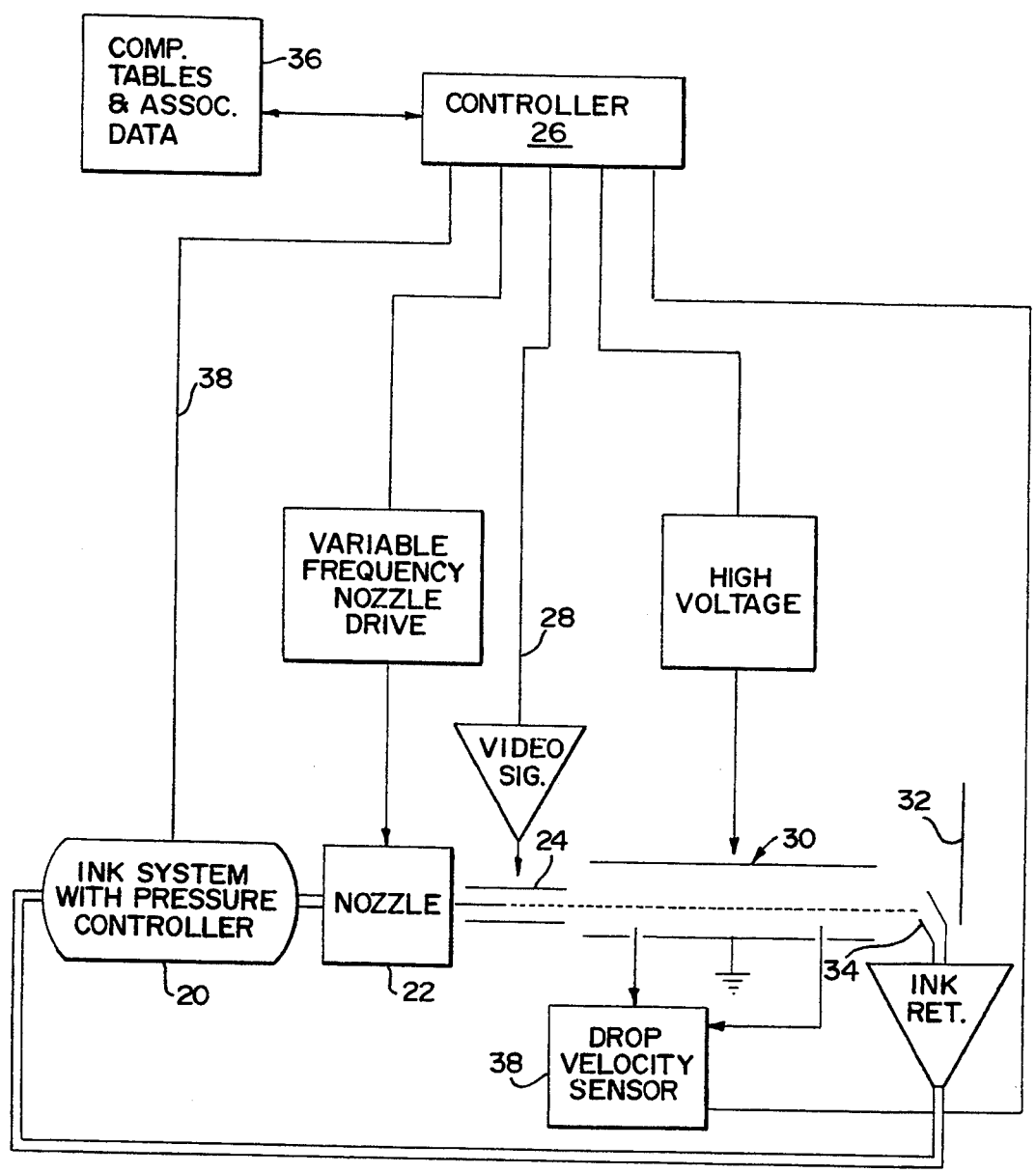
FIG. 2 is a block diagram of an ink jet printer system employing the teachings of the present invention.

Referring to FIG. 2, a block diagram of an ink jet printer system suitable for use with the present invention is illustrated. Some of the hardware represented in FIG. 1 is conventional. Accordingly, only a brief description of the conventional components will be given. Ink is supplied from an ink system 20 to a nozzle 22 having an orifice (not illustrated) of a specified diameter (on the order of 20 to 300 microns). A piezo-electric or similar device is used to apply a stimulation voltage to the nozzle in a manner well known in this art. The voltage is of a selectable frequency and magnitude as will be described herein. The ink is supplied to the nozzle under pressure. As it leaves the orifice, it breaks into droplets due to the effects of the stimulation voltage. Selected droplets are charged in a charge tunnel structure 24 according to the font information received from the print controller 26 on line 28. The drop stream then passes through a high voltage deflection structure 30 causing the charged droplets to be deflected onto a substrate 32. Uncharged drops are received by a catcher 34 and returned to the ink system for reuse.

The controller 26, which is typically a micro-processor or similar computing device, includes memory 36 having stored therein compensation data for correctly printing images, for example, various alpha-numeric character fonts and graphics. Such compensation tables are well known in the art and are usually empirically determined to provide charge tunnel voltage information for correct drop placement. For additional information concerning compensation table data reference is made to U.S. patent application Ser. No. 07/840,161 filed Feb. 24, 1992 assigned to the present assignee and hereby incorporated by reference.

Figure 3:
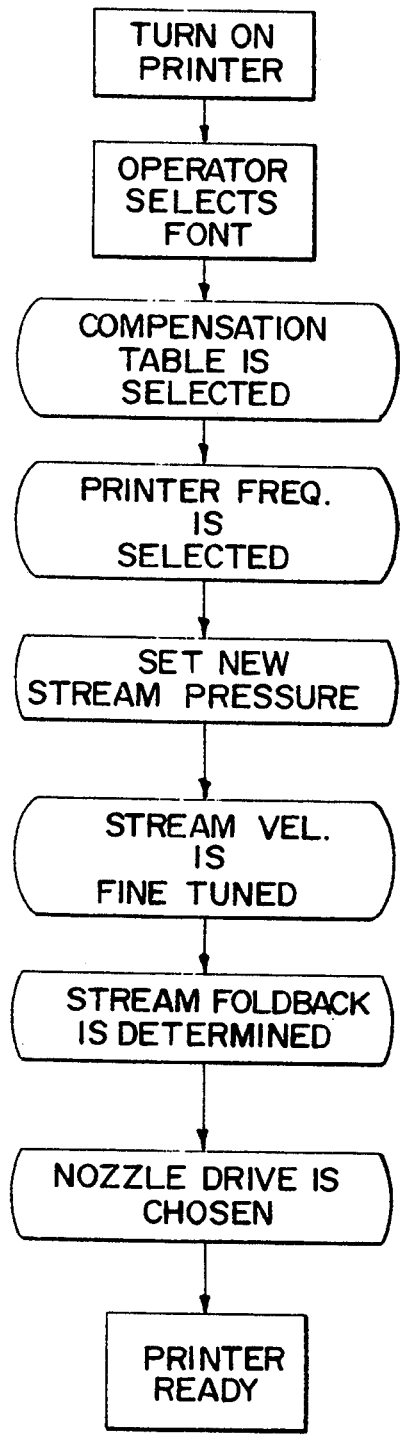
FIG. 3 is a flow diagram of the manner in which the print controller automatically selects the correct nozzle drive frequency, amplitude and stream pressure according to the present invention.

According to a preferred embodiment of the present invention, the stimulation voltage (nozzle drive) frequency and magnitude are determined by the controller 26 in a manner described in FIG. 3. Also variable is the pressure applied to the ink. The ink pressure is adjusted by incorporating a pressure controller of a type known in this art into the ink system 20. The pressure controller is responsive to a signal from the controller 26 via line 38.

By correctly varying the nozzle drive frequency and ink pressure, drop velocity can be changed while the ratio λ/d (drop spacing to stream diameter) is maintained constant. For a given orifice size if λ/d is maintained relatively constant then it follows that drop size also remains constant. In order to ensure predictable drop break-off within the charge tunnel 24 it is important to keep this ratio relatively constant, preferable at a value of about 5. By maintaining drop size constant, a decrease in velocity results in an increase in deflection of charged drops.

In order to ensure optimum performance, a drop velocity sensor 38 is provided along the flight path of the drops. The information from the sensor allows the controller to "fine tune" the velocity of the drops by adjusting pressure to optimize printer performance.

Referring to FIG. 3, a flow diagram of the operation of the system illustrated in FIG. 2 is provided. The printer is turned on and the operator selects a font which it is desired to print. The controller 26 then optimizes the ink jet printer for best quality and speed for that particular font. Specifically, after the font is chosen, the controller accesses the data stored in memory 36 to determine compensation data for that font. As will be understood by those skilled in this art, the table contains the "video signal" information required for charging the drops in charge tunnel 24. In addition, the tables in memory 36 also contain the appropriate frequency range (determined from data such as that shown in FIG. 4) at which the printer should be operated to maximize print quality and speed. More specifically, embedded in the compensation table is the maximum frequency at which the required deflection can be obtained. This is the preferred frequency since it will yield the highest print speed.

Next, a calculation based on the selected frequency is performed by the controller to determine the correct pressure setting. Recall that it is desired to keep λ/d constant to ensure proper drop formation. Since v=fλ, when drop frequency is lowered it is also necessary to alter the ink pressure. Otherwise, λ, which is related to pressure, would change. Pressure is related to stream velocity (ignoring surface tension) by the formula:

$$P = Av + Bv^2$$

where v is the stream velocity and A and B are constants.

The first term is the pressure required due to viscosity to move the ink through the ink system, while the second term is the pressure required to propel the drops at velocity v. The sum of the two terms is the required gauge pressure.

Recognizing that v=fλ, if λ is a constant, the equation becomes:

$$P = Af + Bf^2$$

Here A and B are redefined to include the constant λ.

The constants A and B are determined during machine setup. Once a frequency and a velocity are selected, the pressure can be recorded. If this procedure is done at two different frequencies, both constants can be determined.

The last pressure equation is stored in the controller's memory along with the constants. Once a frequency is decided upon, the equation will provide a first approximation for the gauge pressure required at the selected frequency. Test printing now begins. Data from the drop velocity sensor 38 is used by the controller to "fine tune" the pressure setting.

Referring again to FIG. 3, after the jet velocity has been accurately set, it is necessary to determine the stream foldback point. This corresponds to the nozzle drive voltage which provides the minimum drop break-off length. One method for determining the foldback point is disclosed in co-pending patent application Ser. No. 07/523,847, hereby incorporated by reference. Once the foldback point has been determined, the correct magnitude of the nozzle drive voltage for the requested frequency is determined by the controller as explained in the referenced patent application. If, by chance, the magnitude is too great, the controller can seek a nearby, lower frequency which has a lower drive amplitude. The printer is now ready to print the selected font.

From the foregoing it will be understood that the present invention improves over the prior art by permitting one printhead to produce images of various sizes at optimum print speed where previously different printheads having different orifice openings and merge distances were required for each image category to operate at optimum print speed. The need for and use of uncharged guard drop printing techniques are minimized. Small images are produced at high speeds with high velocity drops while large images are produced with lower velocity drops. Because of the virtual elimination of the need for guard drops print output speed is comparable to prior art devices optimized for a specific image group. The present invention thus achieves a substantial increase in the range of deflection that can be obtained from a given printhead while maintaining or improving quality and speed. For example, a first printhead running at 50 kHz and using the present invention and no guard drops can print the same character height that otherwise would require operation at 66 kHz running with guard drops (every other drop). The first printhead is running at an effective print drop frequency of 50 kHz while the second printhead is running at a 33 kHz effective drop frequency because only every other drop is used for printing.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed:

1. A variable frequency ink jet printer for printing font or graphic images of various sizes comprising:
    a) a nozzle having an orifice through which ink may be ejected;
    b) means for supplying ink to said nozzle at a selectable pressure;
    c) means for applying a drive voltage to said nozzle at a selectable frequency to cause formation of a stream of ink drops as the ink is ejected from said orifice;
    d) charge electrode means for applying an electrical charge to selected ink drops in said drop stream;
    e) deflection electrode means for deflecting said charged drops from their initial flight path;
    f) controller means for selecting the nozzle drive frequency as a function of the deflection required to produce a desired font or graphic and for selecting the ink supply pressure based on said selected frequency to maintain the ratio $\lambda/d$ and drop size substantially constant where $\lambda$ and d represent drop spacing and stream diameter, respectively;
    whereby higher frequencies produce less deflection for smaller images while lower frequencies produce greater deflection for larger images.

2. The printer of claim 1 further including:
    means for detecting drop stream velocity and for communicating said velocity to said controller means to ensure precise adjustment of the ink pressure.

3. The printer of claim 1 wherein said means for applying is a voltage source, variable in both frequency and magnitude.

4. The printer of claim 1 wherein said controller means includes:
    a) memory means having stored therein flight compensation data and nozzle drive frequency information for a range of image sizes;
    b) a processor means for accessing the correct frequency information in said memory means for a selected image and for calculating the required pressure and drive voltage.

5. In an ink jet printer having a nozzle, a pressurized ink supply for the nozzle, means for applying a stimulation voltage to the nozzle to form a stream of ink drops and means for charging and for deflecting selected drops, the improvement comprising:
    means for selecting the frequency of the stimulation voltage as a function of the size of the font or graphic image to be printed and for adjusting the ink supply pressure to maintain the ratio $\lambda/d$ and drop size substantially constant where $\lambda$ and d represent drop spacing and stream diameter, respectively;
    whereby higher frequencies produce less deflection for smaller images while lower frequencies produce greater deflection for larger images.

6. The printer of claim 5 wherein the means for selecting also includes means for determining the magnitude of the stimulation voltage.

7. A method of operating an ink jet printer having a nozzle, a pressurized ink supply, means for applying a stimulation voltage to the nozzle to create a drop stream and means for charging and for deflecting selected drops to permit printing of different font or graphic image sizes, comprising the steps of:
    a) selecting an image size;
    b) adjusting the stimulation voltage frequency as a function of image size such that larger images are printed using lower frequencies and vice versa;
    c) adjusting the ink supply pressure based on the frequency selected to maintain $\lambda/d$ and drop size substantially constant where $\lambda$ and d represent drop spacing and stream diameter, respectively.

8. The method of claim 7 wherein the step of adjusting the stimulation voltage frequency includes the substep of:
    selecting the highest frequency which will produce adequate deflection for the selected image and at which the nozzle is drivable.

9. The method of claim 7 wherein the step of adjusting the ink supply pressure includes the substep of calculating the pressure according to the formula:

$$P = Af + Bf^2$$

where A and B are constants and f is the selected frequency.

10. The method of claim 7 further including the steps of:
    a) sensing drop velocity;
    b) readjusting the ink pressure to compensate for any error in the initially computed pressure required to maintain $\lambda/d$ and drop size substantially constant.

11. In an ink jet printer which has a printhead for producing a stream of ink to which perturbations are applied to generate regularly spaced drops which are selectively charged and projected through a deflection field having a merge zone toward a substrate, the combination comprising:
    a) means for producing signals representing a predetermined image to control the charge applied to each drop;
    b) means responsive to a dimensional parameter of said predetermined image for determining a maximum drop generation frequency at which drops are projectable within the merge zone;
    c) driver means coupled to the stream to generate the drops; and
    d) means for applying said maximum frequency to said driver means.

12. In an ink jet printer which has a printhead for producing a stream of ink to which perturbations are applied to generate regularly spaced drops which are selectively charged and projected through a deflection field having a merge zone toward a substrate, the combination comprising:

a) driver means coupled to the stream to generate the drops;

b) means for producing signals representing a predetermine image to control the charge applied to each drop;

c) means for setting said driver means to generate drops at a frequency which is the maximum the printhead can project within the merge zone to print said predetermined image;

d) means for applying said maximum frequency to said driver means;

e) means for sensing the velocity of said projected drops; and f) means responsive to said drop velocity sensing means for maintaining the velocity of said drops substantially constant.

* * * * *